(12) United States Patent
Pitzer et al.

(10) Patent No.: US 6,905,566 B1
(45) Date of Patent: Jun. 14, 2005

(54) ISOLATED TRACER HAVING CONTROLLED CONDUCTANCE RATE AND METHOD OF MAKING SAME

(75) Inventors: R. Knox Pitzer, San Marcos, TX (US); Roy E. Barth, San Marcos, TX (US); Donald W. Hirsch, New Braunfels, TX (US)

(73) Assignee: Thermon Manufacturing Company, San Marcos, TX (US)

(*) Notice: Subject to any disclaimer, the term of this patent is extended or adjusted under 35 U.S.C. 154(b) by 0 days.

(21) Appl. No.: 10/031,276

(22) PCT Filed: May 5, 2000

(86) PCT No.: PCT/US00/12372

§ 371 (c)(1), (2), (4) Date: May 30, 2002

(87) PCT Pub. No.: WO00/67995

PCT Pub. Date: Nov. 16, 2000

Related U.S. Application Data

(60) Provisional application No. 60/133,176, filed on May 7, 1999.

(51) Int. Cl.[7] .............................................. B29D 23/00
(52) U.S. Cl. ........................ 156/201; 156/203; 156/465
(58) Field of Search .................................. 156/200, 201, 156/203, 217, 465, 466; 264/280, 284, 294; 138/149, 150; 428/36.1, 36.2

(56) References Cited

U.S. PATENT DOCUMENTS

| | | |
|---|---|---|
| 3,259,533 A | 7/1966 | Philipson |
| 3,594,246 A | 7/1971 | Arovelius |
| 3,949,189 A | 4/1976 | Bilbro et al. |
| 4,152,577 A | 5/1979 | Leavines |
| 4,307,053 A | 12/1981 | Daws et al. |
| 4,590,108 A | 5/1986 | Nippe |
| 5,086,836 A | 2/1992 | Barth et al. |
| 5,897,732 A | 4/1999 | Schlameus et al. |

*Primary Examiner*—Mark Eashoo
(74) *Attorney, Agent, or Firm*—Akin Gump Strauss Hauer & Feld LLP; Gregory M. Hasley; Louis H. Iselin

(57) ABSTRACT

An isolated tracer includes an elongated tube, a layer of insulation covering the tube, and a layer of tape compressing the insulation to provide a desired conductance rate for the isolated tracer. The isolated tracer is made by passing a pipe concurrently through a funnel-shaped die with a layer of insulation and wrapping tape around the insulation after it leaves the die. The insulation is compressed to a desired amount to provide a desired conductance rate by adjusting tension on the tape as it is wound about the insulation covering the tube.

18 Claims, 3 Drawing Sheets

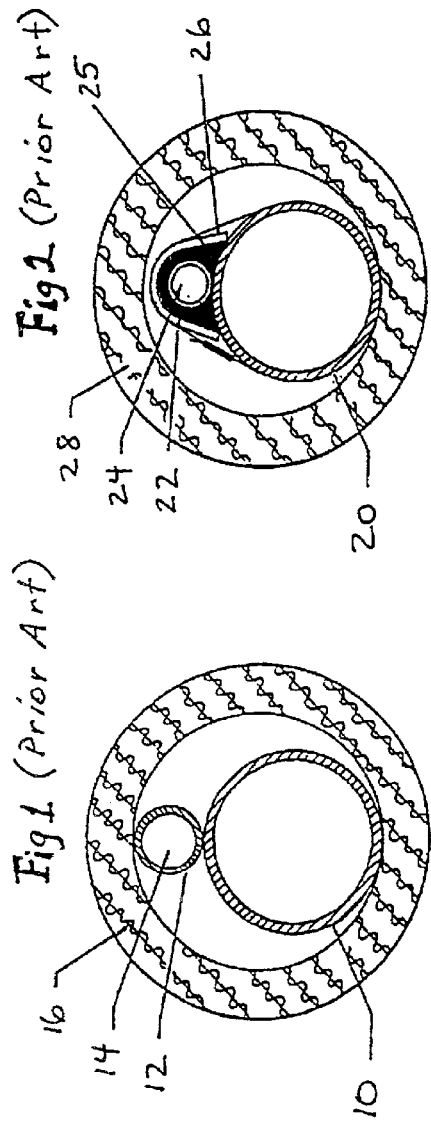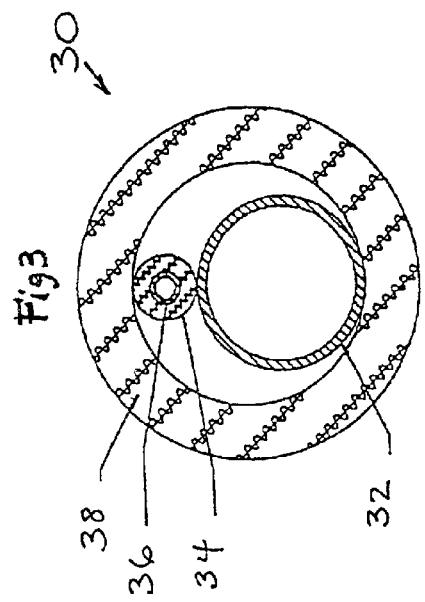

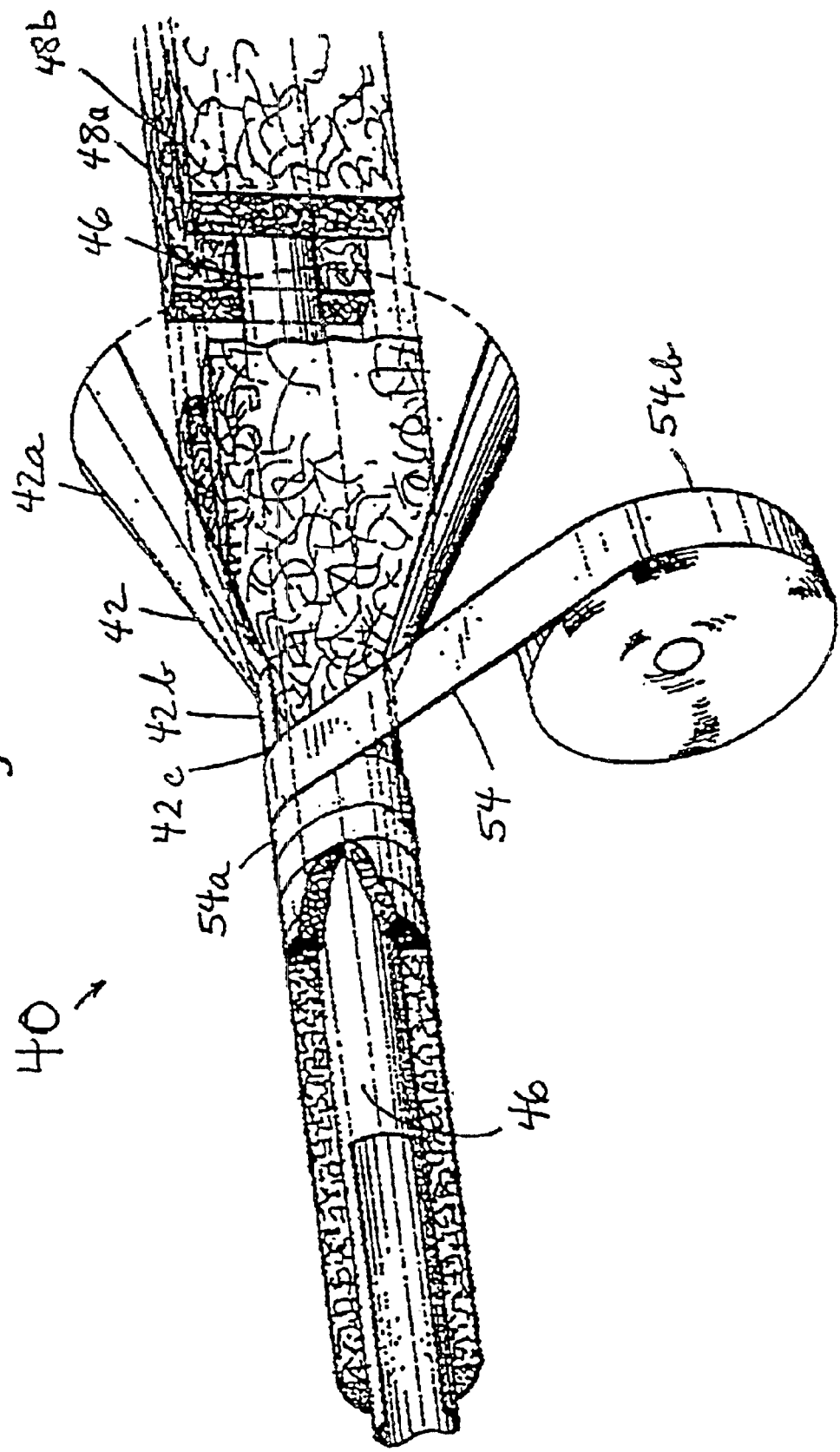

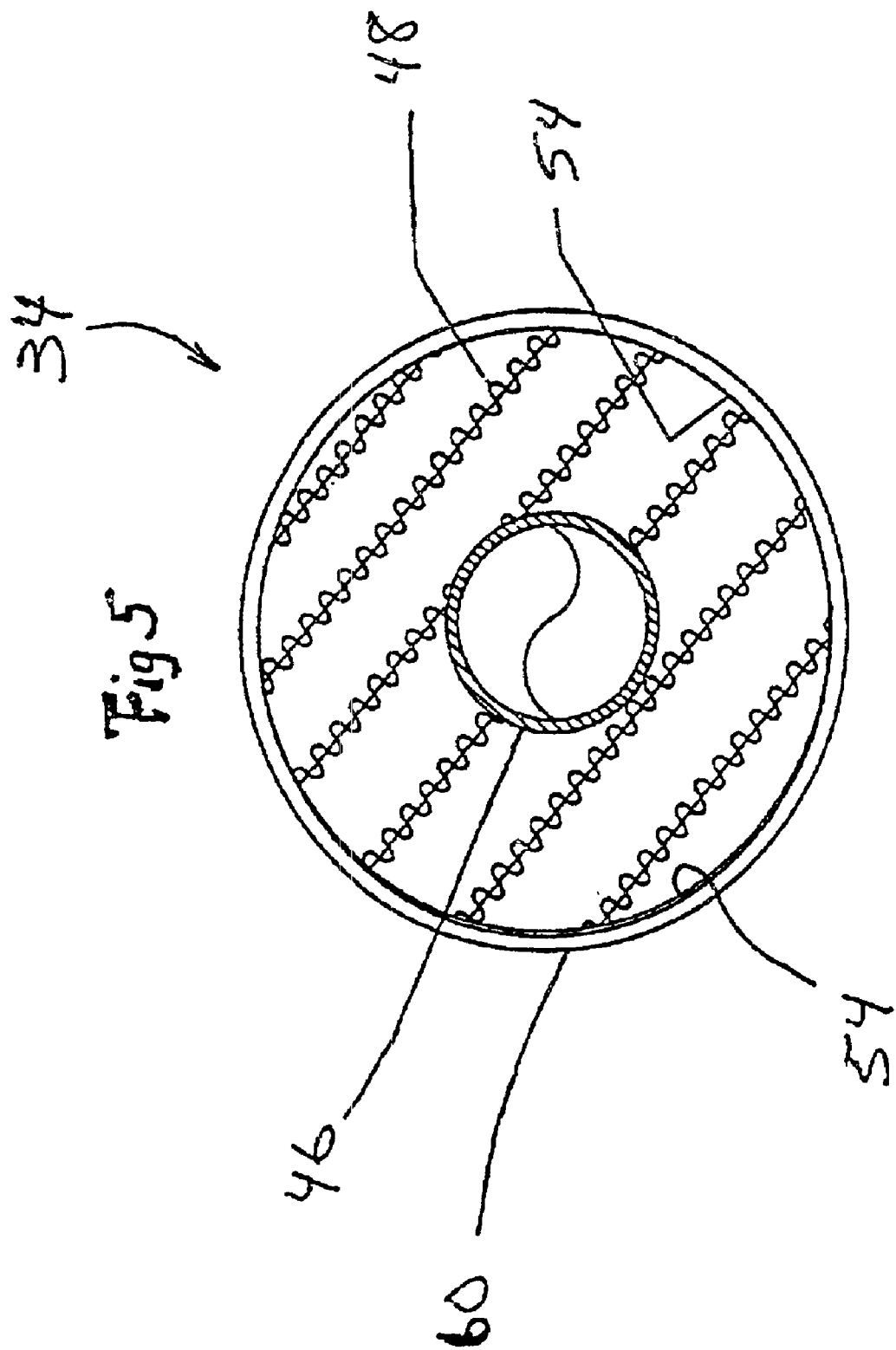

ISOLATED TRACER HAVING CONTROLLED CONDUCTANCE RATE AND METHOD OF MAKING SAME

This application claims priority from U.S. Provisional Patent Application Ser. No. 60/133,176 filed May 7, 1999.

The present invention relates generally to a heat transfer apparatus and method, and more particularly to a heat tracing apparatus and method.

Tracing systems using steam or hot fluids as the heating medium are generally installed in industrial process plants such as refineries and chemical plants to prevent the freezing of materials in process, service, or utility piping or equipment during shut-down periods or in cold weather. Also, process fluids having pour points higher than normal ambient temperatures require heat to keep them flowing all year long. Steam tracing may be defined as a small-elongated pipe or tube carrying steam, which is placed parallel and attached to the outer surface of a pipeline or other industrial equipment that must be kept sufficiently warm. Since the steam tracer follows or "traces" the pipeline, the tube or pipe is referred to as the "tracer", "tracer tube", "tracer pipe" or simply "tracing." In heat transfer equipment where one of the fluids condenses, the equipment is designated as either a condenser or as a heater, depending upon whether the primary purpose of the equipment is to condense the one fluid or heat the other fluid. A steam tracer is therefore a heater since the purpose of the steam in the tracer is to heat the process fluid in a pipe or equipment by the condensation of steam in the tracer. Once a steam tracer has been attached to the pipe or equipment requiring heat, the pipe (or equipment) and tracer are covered with thermal insulation to conserve energy and maintain the design process temperature. The term steam tracing as used herein refers to steam or any other hot fluids used as the heating medium for tracing. The terms "pipe," "pipeline," "process pipe" or simply line(s) as used herein are used interchangeably and include tubes, conduits or other members carrying fluids that must be kept sufficiently warm. Likewise, the term equipment refers to valves, pumps, tanks, towers, drums, reactors, exchangers or other types of equipment containing fluids that may use steam tracing.

There are three basic methods of steam tracing. The first and most widely used method is "convection" or "bare" tracing which is simply a metallic tube generally of copper or stainless steel construction (or sometimes a small bore steel pipe) which is placed parallel to a pipeline and secured in place with tie wire, metallic banding materials, high temperature tape or other similar methods. Sometimes the bare convection tracer is spiraled around the pipe. Heating relies on spot contact between the tracer and the pipe together with convection (thus the term "convection" tracing) to the surrounding air inside the annular air space between the oversized thermal insulation and the process pipe, along with radiation from the tracer tube to the process pipe. For all methods of steam tracing, the thermal insulation is usually sized to fit a pipe at least one size larger than the traced pipe to accommodate both the tracer and the pipe. Bare tracing provides temperature maintenance for intermediate temperatures in the range of approximately 100° F. (38° C.) to 200° F. (93° C.). A temperature maintenance design of a steam or hot fluid tracing system is one in which the tracing system should be designed to deliver only sufficient heat to keep the pipe and equipment at a specified temperature.

Although bare convection tracing is the most widely used method of steam tracing, it also contributes the most to energy wastage and environmental pollution due to being used on freeze protection and other low to medium temperature applications where it frequently raises pipe temperatures much higher than required. This energy wastage for over designed steam tracing circuits can be compared to a steam leak at a fitting or a failed steam trap. For example, a steam leak as small as a ⅟₃₂-inch hole will waste 3,175 pounds of steam a month in a 100 psig steam system. Most medium sized refineries and chemical plants will have at least 50,000 feet of steam tracing and sometimes much more. If just 1% of the bare convection traced piping, or 500 feet, is producing 8 Btu's per foot more than required, the energy wastage is equivalent to the ⅟₃₂-inch hole or 3,175 pounds of steam a month. Most designs of bare convection tracing used for freeze protection or low to medium temperature applications waste considerably more than 8 Btu's per foot of traced piping as will be described later.

The primary purpose of steam tracing is to maintain the heat in a pipe or equipment by supplying heat to the pipe at a rate equal to the heat lost from the pipe through the thermal insulation. Selecting a steam tracer that will deliver heat at a rate as close to the calculated heat loss as possible will save considerable energy and reduce pollution. The heat loss of a thermally insulated pipe can be expressed by equation (1) below. The outside surface film coefficient of the thermal insulation is excluded in this equation and can generally be ignored for outdoor conditions with wind where most industrial piping systems are located. Since thermal insulation is generally sized to fit at least one pipe size larger than the pipe being heated for a steam traced system, the heat lost through the insulation is calculated on the basis of the actual size of the insulation, not the size of the pipe being heated.

$$Q_{loss} = \frac{0.523 \times r_2 \times (T_p - T_a)}{\frac{r_2 \times \ln(r_2/r_1)}{k}} \tag{1}$$

Where:
0.523=2π÷12 to convert Btu per square foot of insulation surface area to Btu per linear foot of pipe
$Q_{loss}$=Heat loss through the thermal insulation, Btu/hr-ft
$T_p$=Steady state pipe temperature, ° F.
$T_a$=Ambient temperature, ° F.
$r_2$=Outside radius of insulation, inches
$r_1$=Inside radius of insulation, inches
k=Thermal conductivity of insulation, Btu/hr-ft²-° F./in The overall heat transfer coefficient between fluids being heated or cooled through a heat transfer surface is defined as the rate at which heat is transferred from one fluid to another fluid per unit of heat transfer area and per degree temperature difference between the two fluids. Generally the heat transfer rate for tracing is based on a conductance value. The conductance value is derived to reflect the normalized heat transfer coefficient of the heat transfer element (tube). Rather than using the heat transfer area, the coefficient is normalized in terms of a "per unit length" usually reduced to feet or meters. The conductance value designated as $C_T$ for tracer conductance is commonly given in Btu/hr-ft-° F. (W/mK). The heat input from a steam tracer to a pipe being heated is:

$$Q_t = UA \times (T_s - T_p) \tag{2}$$

Where:
$Q_t$=heat generated by the steam tracer (Btu/hr-ft)
U=Overall heat transfer coefficient, from the tracer to the pipe (Btu/hr-ft²-° F.)

A = Effective steam tracer heat transfer area (ft²/ft)
$T_s$ = Steam temperature, ° F.
The thermal conductance of the tracer to the pipe is:

$$C_t = U \times A = (Btu's/hr\text{-}ft\text{-}° F.) \text{ then, } Q_t = C_t \times (T_s - T_p) \qquad (3)$$

at a steady state temperature,
Let $C_I$ represent the conductance of the thermal insulation in Btu/hr-ft-° F., and $C_T$ represent the tracer conductance in Btu/hr-ft-° F.

$$Q_{loss} = Q_t \text{ therefore: } C_I \times (T_p - T_a) = C_T \times (T_s - T_p) \qquad (4)$$

The steady state temperature $T_p$ can be expressed as:

$$T_p = [(C_I \times T_a) + (C_t \times T_s)] \div (C_I + C_T) \qquad (5)$$

Note: The insulation conductance $C_I$ can be readily calculated using equation (1) by setting $(T_p - T_a) = 1$.

The tracer conductance $C_t$ is experimentally derived by measuring the heat loss $(Q_{loss})$ and the process and ambient temperatures $(T_p$ and $T_a)$ on a traced pipe. The ratio of tracer conductance to insulation conductance forms the dimensionless group known as R and frequently referred to as R factor:

$$R = C_T / C_I \qquad (6)$$

$$\text{Or, } R = (T_p - T_a) \div (T_s - T_p) \qquad (7)$$

$$\text{And, } T_p = [(R \times T_s) + T_a] \div (R + 1) \qquad (8)$$

$$\text{Then, } T_s = [(T_p - T_a) \div R] + T_p \qquad (9)$$

The above methods can be used for any type of steam tracer for steady state conditions and eliminates the need to determine effective tracer area and the break down of heat transferred by conduction, convection and radiation.

Accurate temperature control for a pipe carrying process fluids in an industrial plant along with freeze protection for service and utility lines is essential to the successful production of the finished product and the conservation of energy. Inaccurate or poorly designed steam tracing systems can create serious problems for a process plant.

The second method of steam tracing is termed "conduction" tracing, because the tracer which is simply copper or stainless steel tubing (or sometimes small bore pipe) is thermally bonded to the process pipe or equipment with a highly conductive heat transfer compound, thus termed "conduction" tracing. The heat transfer rate or conductance of one conduction tracer is equivalent to from three to five bare convection tracers or more depending on pipe size and other parameters. Conduction tracers are used where higher temperatures are needed or where heat-up conditions exist. Conduction tracers are generally required to hold process pipes in the range of approximately 200° F. (93° C.) to 400° F. (204° C.). A conduction steam tracing method is disclosed in U.S. Pat. No. 3,949,189.

The third method of steam tracing is called "isolated" tracing and is used where less heat is required than that provided by the previous two steam tracing methods. Normal saturated steam pressures (temperatures) will frequently deliver too much heat and use excessive energy for low temperature or temperature sensitive applications when bare convection tracers are applied. Conduction tracers are for much higher temperatures as previously discussed. There are several tracing methods that will deliver a lower heat output than bare convection tracing. One method consists of placing spacer blocks such as wood or high temperature rigid insulation blocks between the steam tracer and the process pipe at specified distances along the length of the traced pipe. The blocks provide an air gap between the tracer and the process pipe thus retarding the heat flow to the pipe. The problem with the spacer block method is that the blocks are difficult to keep in position during installation and frequently slip out from under the tracer tube while in service due to expansion and contraction of the tube. Another method of isolating the tracer tube from the process pipe is to provide a heat retarding material between the pipe and the steam tracer tube. Some systems consist of small tubes generally ¼-inch (6 mm) to ¾-inch (20 mm) diameter that have a factory applied insulating material wrapped around them. Typically, the insulating material is fiberglass or other flexible types of thermal insulation materials that are either helically (spirally) wrapped on the tube or linearly wrapped on the tube using long strips of insulation. Another method of isolating the tracer from the pipe is described in U.S. Pat. No. 5,086,836.

Tubing that is factory insulated and covered with an outer polymer jacket is well known in the industry. It is used in refineries, chemical plants, power plants, steel mills and other industries to transport process gases or other fluid streams for flow rate measurement, plant emissions analysis or simply to deliver a fluid from one point to another. Factory insulated tubing of this type is similar to that used for isolated steam tracing. However, it has been found that the standard product cannot be used effectively as an isolated tracer. Isolated tracers require special fabrication to produce specific conductance rates at two or more levels below that covered by bare convection tracers in order to optimize the heat delivery potential. A substantially precise and optimized rate of heat delivery from the isolated steam tracer is a critically important factor for keeping industrial pipeworks sufficiently warm during extreme weather conditions while reducing the heat output, energy consumption and pollution that can be attributed to many bare convection tracing designs.

A well-known method of applying insulation to long coils of tubing or to piping involves the helical winding of thin strips of thermal insulation material in an overlapping fashion. Multiple passes of helically wound insulation strips are applied and built-up to the desired thickness as the tube passes through a wrapping head or die. Other methods as described in U.S. Pat. No. 3,259,533 and U.S. Pat. No. 3,594,246 describe advancing a strip or strips of insulation material together with a tube or pipe in a longitudinal direction of the tube or pipe through a wrapping head or die.

Multiple layers of the insulation strip can be applied in a linear fashion to arrive at the desired thickness. This procedure is called the "linear wrap" method. As the insulation is being applied in both the linear wrapping and the helical wrapping methods, the insulation on the tube is generally captured immediately as it leaves the front of the wrapping head or die by encircling the insulation material with wire, cord, metal, coils, rings or a polymeric tape-like material in order to keep it from expanding circumferentially.

Often a reflective material such as an aluminized plastic tape is used to capture the insulation material and help retard heat loss by radiation. A suitable outer jacket comprising a wrapped polymeric tape or an extruded polymeric material is generally applied over the insulation and tape-like material to provide weather protection.

The primary purpose of the known methods of factory insulating tubes or pipes is to reduce the cost over field installed insulation of these lines that are used to transport process, service, or utility fluids throughout an industrial plant. The insulating effect is of primary importance. Therefore, insulation is preferably maintained at as low a density as possible with air trapped in interstices to minimize thermal conductivity. Compression of the insulating material in either the helical wrapping or linear wrapping manufacturing methods described herein has been considered undesirable because it reduces the insulating quality of the preinsulated tubing.

Compression of insulation has been mentioned in the prior art, but not as a desired attribute. For example, U.S. Pat. No. 3,594,246 describes a die as "compressing the insulating material around the circumference of the piping." However, this simply means that when a pipe or tube is drawn through the funnel-shaped die and nozzle, some compressive force is applied to cause the long flat strips of insulation to conform to the shape of the tube or pipe. Although wrapping methods such as this may compress the insulating material to some minor degree, purposeful and measured compression of the insulating material to bring about an increase in the thermal conductivity is not a desired feature or intent of any of these prior art wrapping methods.

The thermal conductivity or K value of a material describes the rate at which heat is conducted through the material. Generally, it is desirable to maintain the thermal conductivity of the insulating material as it is in its manufactured thickness by reducing or substantially eliminating compressive forces on the insulation when it is applied in the linear or helical wrapping head or die. Compressing the insulation increases the density and thus the thermal conductivity of the material.

In assignee's U.S. Pat. No. 5,897,732, a process is described that accomplishes the wrapping operation with basically no compressive forces applied to the insulation. The advantage of this method for producing insulated tubes designed to transport hot or cold fluids is that the tubes can be wrapped at a substantially faster rate than the helical wrapping method. Further, theoretical calculations of the surface temperature of tubes insulated by the process of the '732 patent closely match the heat transfer measured in actual laboratory tests because the insulation material essentially retains its manufactured thermal conductivity. Therefore, reliable surface temperatures for personnel protection and other purposes can be easily calculated for tubes transporting hot fluids for various industrial applications.

A heat transfer coefficient or tracer conductance ($C_t$) preferably derived from empirical data collected from results of tests conducted on several pipe sizes must be known for any commercially viable heater. A reliable conductance value is imperative when determining the temperatures that can be held on various pipe sizes under a given set of design conditions when the heaters are steam tracers.

A disadvantage which arises by using the standard insulated tubing products as steam tracers is that the standard products are designed for transporting hot or cold fluids from point A to point B in an industrial facility and are not manufactured for a specific conductance rate that will be most suitable for a steam tracing application. The standard insulated tubing product is designed and manufactured for its insulating value and not for its conducting value.

Certain insulating variances are not particularly critical for the standard product as long as the surface temperature of the outer polymeric jacket covering the insulation does not reach a temperature that will present a personnel hazard. But, where insulated tubes are used as heaters to provide temperature maintenance for pipes and equipment as is the case with isolated steam tracers, variable or arbitrary heat transfer rates present an obstacle to the comparison and modeling of the heat transfer characteristics for systems design purposes.

A desired heat conductance is provided by a heat transfer assembly, which is made by covering a tube with insulation and compressing the insulation to a desired thickness to provide a desired thermal conductance rate. The desired thickness and compression of the insulation can be provided by wrapping a tape-like material around the insulation. Compression on the insulation can be controlled by adjusting tension on the tape-like material as it is wound around the insulation that covers the tube.

An isolated tracer is provided that includes a tube, a layer of insulation covering the tube, and a layer of tape-like material wrapped around the insulation such that the insulation is compressed to a desired thickness. Having the insulation compressed to a desired thickness provides a desired thermal conductance rate for the isolated tracer. A jacket of polymeric material can cover the tape-like material, which covers and compresses the insulating material. By testing an isolated tracer thus made, tension on the tape-like material can be adjusted to provide a desired compression on the insulating material, which then provides a desired conductance output rate.

In order to more fully understand the drawings referred to in the detailed description of the present invention, a brief description of each drawing is presented, in which:

FIG. 1 is a typical cross-sectional view of a process pipe that is traced by a prior art bare convection tracer;

FIG. 2 is a typical cross-sectional view of a process pipe that is traced by a prior art conduction tracer;

FIG. 3 is a cross-sectional view of a process pipe that is traced by an isolated tracer according to the present invention;

FIG. 4 is a cutaway schematic view of an isolated tracer made according to the present invention; and FIG. 5 is a cross-sectional view of an isolated tracer according to the present invention.

FIGS. 1 and 2 have been provided to better illustrate the prior art tracers described in the background of the invention FIG. 1 illustrates a typical bare convection tracing system in cross-sectional view. Referring to FIG. 1, a process pipe 10 is traced by a bare convection tracer 12 that carries a heat transfer medium 14. The combined process pipe 10 and the bare convection tracer 12 are covered with a thermal insulation 16, as known in the prior art FIG. 2 illustrates a typical conduction tracing system in cross-sectional view. Referring to FIG. 2, a process pipe 20 is traced by an elongated tube or pipe 22 that carries a heat transfer medium 24. The pipe 22 is encapsulated in a heat transfer compound 25 to form the conduction tracer 26. The combined process pipe 20 and the conduction tracer 26 are covered with thermal insulation 28, as known in the prior art.

The isolated tracer system of the present invention, generally designated as reference number 30, will now be discussed with reference to FIGS. 3–5. FIG. 3 is a cross-sectional view of the isolated tracer system 30, according to the present invention. The isolated tracer system 30 includes a process pipe 32 which is traced by an isolated tracer 34 that carries a heat transfer medium 36. Referring to FIG. 3, the combined process pipe 32 and the isolated tracer 34 are preferably covered with thermal insulation 38, according to the present invention. A cross-section of the isolated tracer 34 according to the present invention is shown in FIG. 5.

As shown in FIG. 4, a metallic or high temperature polymeric tube or tubular element 46 is surrounded by an insulating material 48a and 48b, which is wrapped by and in a tape-like material 54 that holds and compresses the insulating material 48a and 48b to a desired diameter. The tube 46 can be made of copper, steel, stainless steel, aluminum or other metallic or plastic materials suitable for use with saturated steam or other hot fluids. Preferably, an outer jacket 60 is applied over the tape-like material 54. The material of the outer jacket 60 can be a wrapped, braided, or extruded polymeric material, such as an extruded silicone rubber.

The insulating material 48a and 48b is preferably made of flexible, compressible fiberglass, mineral wool or other types of flexible, compressible insulating materials. The insulating material 48a and 48b is preferably wrapped around the tubular element 46 by a linear wrapping method or by a helical wrapping method. Multiple layers of insulating material 48a and 48b can be provided by a combination of linear wrapping and helical wrapping, although a combination is not required.

Although an isolated tracer 34 according to the present invention is not limited to any particular type of insulating material 48a and 48b, tape-like material 54, or jacketing material 60, by way of example, a tube 46 for carrying steam may be wrapped with fiberglass insulation 48a and 48b, which may be captured as it leaves a die 42 and compressed to a desired diameter and density by an aluminized plastic tape 54 as shown in FIG. 4. Two or more layers of fiberglass insulation 48a and 48b may be wrapped on the tube 46 and covered by the aluminized tape 54, which may or may not be wrapped on each successive layer of the fiberglass insulation 48a and 48b, before an extruded outer jacket 60 of silicone rubber is applied.

FIG. 4 provides an example of a linear tube wrapping process 40 in which a tubular lead-through die 42 includes a rear portion 42a in the shape of a funnel. A portion of the die 42 has been cut away in the drawing to show the interior thereof, and a front die portion 42b constitutes a substantially circular nozzle. The tube or pipe 46, which is to be insulated, is positioned in such a way that it can be inserted in the funnel shaped portion 42a of the die 42.

In the linear wrap process example illustrated in FIG. 4, two strips of suitable insulating material 48a and 48b are positioned lengthwise along the piping or tubing 46. The pipe 46, together with the strips of insulating material 48a and 48b, are passed through the funnel-shaped portion 42a of the die 42 and the insulating material 48a and 48b is molded around the pipe or tube 46 as it passes through the funnel 42a into the narrow portion of the circular nozzle 42b. The insulating material 48a and 48b is kept in the shape of the nozzle 42b until it is extruded out a front edge 42c of the nozzle 42b. Upon exiting the nozzle 42b, the insulating material 48a and 48b is immediately captured by the tape-like material 54 which is wound onto the outside of insulating material 48a and 48b so that loops 54a overlap each other.

In the preferred embodiment of the present invention, the tape-like material 54 is preferably applied under adjustable preset tension as it is fed from a roll of tape 54b to compress the insulating material 48a and 48b onto the tube 46 to conform to a predetermined diameter compatible with the outside diameter of the tube and the thickness and compressibility of the flexible insulating material 48a and 48b. As explained in greater detail below, the predetermined diameter is found by estimating the required thermal conductivity and thus the dimension of compression required of the insulating material, then physically testing the prototype on a pipe. Test results determine if the calculated diameter is accurate or must be increased or decreased to meet the required conductance value. The tape-like material 54 is unwound from a roll of tape 54b onto the insulating material 48a and 48b while moving the roll of tape 54b in a helical path around the insulating material 48a and 48b as it exits the front edge 42c of the nozzle 42b in such a way that loops 54a of tape 54 overlap each other to a desired extent. Controlling the speed at which the tubing or piping 46 leaves the die 42 versus the speed at which the tape 54 is unwound produces a desired pitch of overlapping of wound tape 54a. The tape-like material 54 can be a metalized or non-metalized polymeric tape, cord, fiber, or strip, and an aluminized polymeric material is used in one embodiment.

Further, the apparatus and process of assignee's U.S. Pat. No. 5,897,732 can be used and/or modified to manufacture the isolated tracer of the present invention. Applicant herein incorporates by reference assignee's U.S. Pat. No. 5,897, 732. The process of the '732 patent accomplishes the wrapping operation with basically no compressive forces applied to the insulation. As a result of this, the theoretical calculations of the surface temperature of tubes insulated by the '732 patent process closely matches the heat transfer measured in actual laboratory tests because the insulation material essentially retains its manufactured thermal conductivity. However, to accomplish the manufacture of the isolated tracer of the present invention the compressive force is applied to the insulation during the wrapping process. Target calculations for the amount of compression or reduction in the insulated tube diameter required to produce a specific conductance rate for the isolated tracers of this invention is made easier by having the known standard insulation thermal conductivity rate as a starting point.

A method is thus provided for making an isolated tracer heat transfer assembly that has a predictable and repeatable heat transfer rate. The isolated tracer 34 is adapted for mounting on a pipe 32 or the like and has a tubular element 46 that is covered with insulating material 48. The insulating material 48 is covered by a tape-like material 54, which is tensioned so that the insulating material 48 is compressed by the tape-like material 54 to a predetermined diameter matching a specific desired conductance output. The tape-wrapped, insulated tube is preferably covered by an outer jacket of polymeric material 60, such as silicone rubber or polyolefin. The isolated tracer assembly 34 is tested to confirm the conductance output, which typically falls within a range of approximately 0.105 Btu/hr-ft-° F. to approximately 0.46 Btu/hr-ft-° F.

In order to provide accurate and energy efficient designs for temperature control of process, service and utility lines in a process plant, and for computer modeling, it is desirable to provide isolated steam tracers with predetermined and substantially consistent conductance rates below the conductance rates provided by bare convection tracing. Bare convection tracing frequently delivers more heat than necessary for freeze protection and other uses such as the tracing of sensitive materials such as caustics and acids. The higher temperatures delivered by bare convection tracing may not have any adverse effect on the quality of certain other materials such as heavy fuel oils or asphalt products. However, any additional heat above the required amount to hold pipe temperatures at a predetermined level contributes to unnecessary stress in the pipeworks, wastes energy and causes more fuel to be burned to generate the steam, which increases environmental pollution.

Isolated tracers as described herein can hold process temperatures from 25° F. to 75° F. (or more) below the temperatures that would be held by bare convection tracers under similar design parameters of process pipe size, insulation type and thickness, saturated steam pressure and ambient conditions. Based on universally accepted heat transfer equations, the temperature reductions provided by the isolated tracers of this invention can result in steam energy savings of from approximately 10% to 60% when compared to the energy consumption of bare convection tracing under similar design parameters as described above.

Heat transfer rates change depending on pipe size and the rate of change is not necessarily the same for each tracing method described herein. Therefore, the energy saving comparisons between tracing methods vary from pipe size to pipe size. A typical energy savings example of an isolated tracer over a bare convection tracer is as follows: An 8-inch process line is to be held at 50° F. for freeze protection in a low ambient temperature of 0° F. with a 25 mph wind speed. The thermal insulation covering the pipe and tracer is 1-½ inch thick calcium silicate and the heating medium is 50 psig saturated steam. A ⅜ inch O.D. bare convection tracer will hold the pipe temperature at 101° F.

An isolated tracer according to the present invention will hold the pipe temperature at 57° F. or a temperature of 44° F. lower than the bare convection tracer. The reduction in steam consumption is approximately 42%. Further, these isolated tracers can be designed to meet standard industry guidelines for a 5 second "touch safe" event, providing a safer environment for workers since the surface temperatures are much lower than bare tracing. Two or more isolated tracers are needed to cover the range of conductance rates required below those of bare convection tracing. Isolated tracers are needed to deliver the necessary heat for maintaining process pipe temperatures in the approximate range above 32° F. (0° C.) up to 150° F. (66° C.) or higher in some circumstances. The standard insulated tube product designed for transporting fluids throughout an industrial facility cannot be effectively substituted for isolated steam tracers. The present invention provides a method of providing consistent heat transfer rates for preinsulated isolated steam tracers whether insulated by the helical wrap or by the linear wrap process.

The present invention includes the discovery that identifying and delivering a specified outside diameter for a tube wrapped with thermal insulation can produce substantially precise and consistent heat transfer rates for isolated tracers. Control over the specified outside diameter of the insulated tube is provided by adjusting the applied tension of the helically wound tape-like material as it captures the insulating material when it exits the wrapping head or die. The insulation material on the tube will be compressed to a predetermined diameter which will alter the thermal conductivity as the insulating material becomes more dense in the tape wrapping process to meet the required tracer conductance rate. Preferably, isolated tracer conductance rates are determined by actual experimental testing of the tracer(s) on test pipes similar to an industrial steam tracing application. If the insulation density compressed to a given diameter does not match the required conductance, adjustments can be made in the tensioning of the helically wound tape until a diameter (or compressed density) is identified that matches the specified tracer conductance rate. The diameter for a given conductance rate may then be standardized in the manufacturing process. Multiple isolated tracers with a standardized conductance rate for each tracer are required to cover the conductance range below that provided by bare tracing.

For example, an approximate diameter for an isolated tracer made up of ⅜ inch O.D. tubing wrapped with 0.125 inch thick fiberglass insulation and covered with an aluminized tape material, will have an outside diameter of approximately 0.631 inches without any compression. After extruding a silicone rubber jacket approximately 0.050 inches thick over the insulated and tape wrapped assembly, the tracer will exhibit a conductance rate of approximately 0.244 Btu/hr-ft-° F. when tested on a 2-inch pipe. This conductance level does not adequately supply heat in the range below bare steam tracing that is required for this tracer. By compressing the fiberglass insulation in the tape wrapping process to provide an outside diameter of approximately 0.575 inches, the tracer will exhibit a conductance rate when tested on a 2-inch pipe of approximately 0.30 Btu/hr-ft-° F. after a silicone jacket of approximately 0.050 inches is extruded over the insulated and tape wrapped assembly.

By compressing the isolated tracer to 0.575 inches in diameter, the heat transfer rate is increased by approximately 23% to provide a more suitable temperature range for this tracer. It is to be understood that the amount of compression can be modified to adjust the heat transfer rate. Preferably, to adequately cover process pipe temperatures in a range below that which can be held by a bare convection tracer, a heater is selected to deliver a conductance rate that is in the approximate range of 30% to 40% below that of a bare convection tracer. Each preceding heater is designed to provide a conductance rate approximately 30% to 40% below the preceding isolated heater.

By way of example and without limiting the present invention to the following example, the base conductance rate for a ⅜-inch O.D. bare convection tracer is approximately 0.55 Btu/hr-ft-° F. The first level of conductance for an isolated tracer of this invention has a base conductance rate of approximately 0.35 Btu/hr-ft-° F., the next isolated tracer has a base conductance rate of approximately 0.23 Btu/hr-ft-° F. and another isolated tracer has a base conductance rate of 0.15 Btu/hr-ft-° F. These conductance rates were developed to appropriately fill the gap that existed for heat output below bare convection tracing in order to reduce thermal stress in the pipeworks, provide lower temperatures for freeze protection and temperature maintenance of process lines and equipment, and to reduce steam energy losses and environmental pollutants. However, it should be understood that this invention is not limited to any specific conductance levels below those of bare convection tracing and the method described herein can be used to produce other required conductance delivery rates for factory preinsulated isolated tracers.

The three conductance levels for the insulation wrapped isolated tracers mentioned above are provided by the method of controlling the diameter of the tracers. By adjusting the tension on the tape-like material used to capture the insulation material in the helical wrap and linear wrap insulation methods as previously described, the necessary compression is applied to bring the tracer diameter to a predetermined dimension. Experimental testing has shown that isolated tracers produced by this method will supply consistent and repeatable heat transfer rates over a range of commonly used industrial pipe sizes.

The conductance rates for these three isolated tracers in the above example used for heating pipes, ducts, conduits, tubes or other equipment can be expressed by the following equations derived by Applicant:

$$C_T = C_{T\ base} \times [1/OD_{pipe}]^{0.09} \times N;\text{ where } C_{T\ base} = 0.15 Btu/hr\text{-}ft\text{-}° F.$$

Where:
  $C_T$=Isolated tracer conductance for each pipe size, Btu/hr-ft-° F.
  $C_{T\ base}$=Base conductance of Isolated tracer, Btu/hr-ft-° F.
  $OD_{pipe}$=Outside diameter of the pipe being traced, inches.
  N=Number of tracers Heater B follows the expression:

$$C_T = C_{T\ base} \times [1/OD_{pipe}]^{0.125} \times N;\text{ where } C_{T\ base} = 0.23 Btu/hr\text{-}ft\text{-}° F.$$

And Heater C follows the expression:

$$C_T = C_{T\ base} \times [1/OD_{pipe}]^{0.20} \times N;\text{ where } C_{T\ base} = 0.35 Btu/hr\text{-}ft\text{-}° F.$$

For pipe sizes larger than 10-inch NPS, use the results of the 10-inch pipe size.

The mathematical expressions have been proven to be substantially consistent with experimental test results for the various pipe sizes tested. Isolated steam tracers manufactured according to the present invention by the linear wrap, helical wrap or other insulation wrapping methods have predictable heat transfer rates for computer modeling and repeatable heat transfer rates from production run to production run.

Thus, the approximate conductance rate ($C_T$) for multiple pipe sizes can be calculated by the following mathematical expression for an isolated tracer having a base conductance rate of approximately 0.15 Btu/hr-ft-° F.:

$$C_T = 0.15 \times [1 \div \text{Outside Pipe Diameter, inches}]^{0.09} \times \text{Number of tracers},$$

where the conductance value for pipes and other cylindrical objects equivalent to or larger than a nominal pipe size of 10 inches remains at the conductance value determined for the 10-inch pipe size.

An approximate conductance rate ($C_T$) for a heat transfer assembly can also be calculated by the following mathematical expression for an isolated tracer having a base conductance rate of approximately 0.23 Btu/hr-ft-° F.:

$$C_T = 0.23 \times [1 \div \text{Outside Pipe Diameter, inches}]^{0.125} \times \text{Number of Tracers}.$$

Again, the conductance value for pipes and other cylindrical objects equivalent to or larger than a nominal pipe size of 10 inches remains at the conductance value corresponding to the 10-inch pipe.

A third equation for calculating an approximate conductance rate ($C_T$) for a heat transfer assembly according to the present invention for an isolated tracer having a base conductance rate of approximately 0.35 Btu/hr-ft-° F.:

$$C_T = 0.35 \times [1 \div \text{Outside Pipe Diameter, inches}]^{0.20} \times \text{Number of Tracers}.$$

For pipes and other cylindrical objects equivalent to or larger than a nominal pipe size of 10 inches, the conductance value is again approximated as the conductance value determined for a 10-inch pipe.

A heat transfer assembly according to the present invention reduces steam consumption over bare convection tracing in the range of approximately 10% to 60%.

The foregoing disclosure and description of the invention are illustrative and explanatory thereof, and various changes in the materials as well as in the details of the illustrated apparatus and construction and method of operation may be made without departing from the spirit of the invention.

What is claimed is:

1. A method for making a heat transfer assembly having predictable and repeatable heat transfer rates, the assembly being adapted for mounting on a pipe, equipment or a vessel, comprising the steps of:
   providing a tubular element;
   covering the tubular element with a layer of insulating material;
   wrapping the layer of insulating material with a tape-like material; and
   tensioning the tape-like material so that the insulating material is compressed by the tape-like material to a predetermined diameter for providing a desired conductance output, wherein the desired conductance output is at least 10 percent greater than a pretensioned conductance output.

2. The method of claim 1, wherein the desired conductance output falls within a range of approximately 0.105 Btu/hr-ft-° F. to approximately 0.46 Btu/hr-ft-° F.

3. The method of claim 1, further comprising applying an outer jacket material over the tape-like material.

4. The method of claim 3, wherein said outer jacket material is an extruded silicone rubber.

5. The method of claim 1, wherein the tubular element is made of copper, steel, stainless steel, aluminum or other metallic or plastic materials suitable for use with saturated steam or other hot fluids.

6. The method of claim 1, wherein the insulating material is a flexible, compressible fiberglass or mineral wool.

7. The method of claim 1, wherein the insulating material is wrapped around the tubular element by a line wrapping method.

8. The method of claim 1, wherein the insulating material is wrapped around the tubular element by a helical wrapping method.

9. The method of claim 1, wherein the insulating material is wrapped around the tubular element by a combination of the linear wrapping and helical wrapping methods where multiple layers of insulating material is required.

10. The method of claim 1, wherein the tape like material is an aluminized polymeric material or other types of metalized or unmetalized polymeric tapes, cords, fibers, or strips.

11. A method for making an isolated tracer having a predictable conductance rate, comprising the steps of:
    passing a tube for conveying a heated fluid through a funnel-shaped die having a wide inlet and a narrow outlet;
    passing an insulating material through the die such that the insulating material is compressed a first amount as the insulating material passes from the wide inlet of the die to the narrow outlet for conforming the insulating material to a cylindrical shape; and
    compressing the insulating material a second amount after the insulating material passes through the narrow outlet for providing a predetermined thickness of insulating material so that a predetermined thermal conductance rate can be provided, wherein the difference in compression on the insulating material between the first amount and the second amount increases thermal conductance by at least 10 percent.

12. The method of claim 11, wherein the step of compressing the insulating material is provided by wrapping the insulating material with a tape-like material.

13. The method of clam 12, further comprising adjusting the tension on the tape-like material to provide a desired compression on the insulating material.

14. The method of claim 13, further comprising covering the tape-like material with a jacket of polymeric material.

15. A method for making an isolated tracer having a predictable conductance rate, comprising the steps of
    passing a tube for conveying a heated fluid through a funnel-shaped die having a wide inlet and a narrow outlet;
    passing an insulating material through the die such that the insulating material is compressed a first amount as the insulating material passes from the wide inlet of the die to the narrow outlet for conforming the insulating material to a cylindrical shape; and
    compressing the insulating material a second amount after the insulating material passes through the narrow outlet for providing a predetermined thickness of insulating material;

determining the conductance rate of the isolated tracer by testing; and changing a tension on a tape-like material in order to control the amount of compression on the insulating material so that a desired thermal conductance rate is provided.

16. A method for making a heat transfer assembly having predictable and repeatable heat transfer rates, the assembly being adapted for mounting on a pipe, equipment or a vessel, comprising the steps of:

providing a tubular element;

covering the tubular element with a layer of insulating material;

calculating an approximate conductance rate ($C_T$): $C_T = C_{T\ base} \times [1+\text{Outside Pipe Diameter, inches}]^{exp} \times \text{Number}$ of tracers, where $C_T$ for pipes and cylindrical objects equivalent to or larger than a nominal pipe size of 10 inches is the same as $C_T$ calculated for a 10-inch pipe size, where $C_{T\ base}$ is one of the group consisting of 0.15, 0.23, and 0.35, where a corresponding exp is one of the group consisting of 0.09, 0.125, and 0.20;

wrapping the layer of insulating material with a tape-like material; and tensioning the tape-like material so that the insulating material is compressed by the tape-like material to a predetermined diameter for providing a desired conductance output.

17. An isolated tracer, comprising:

a tube for conveying a heated fluid;

a layer of insulation covering the tube; and a tape-like material wrapped around the insulation such that the insulation is compressed to a desired, predetermined thickness for providing a desired conductance rate, wherein the desired conductance rate is at least 10 percent greater than an unwrapped conductance rate.

18. The isolated tracer of claim 17, further comprising a jacket of polymeric material covering the tape-like material.

* * * * *

UNITED STATES PATENT AND TRADEMARK OFFICE
CERTIFICATE OF CORRECTION

PATENT NO. : 6,905,566 B1
DATED : June 14, 2005
INVENTOR(S) : R. Knox Pitzer, Roy E. Barth and Donald W. Hirsch It is certified that error appears in the above-identified patent and that said Letters Patent is hereby corrected as shown below:

Column 12,
Line 16, the word "line" should read -- linear --.

Signed and Sealed this

Sixth Day of December, 2005

JON W. DUDAS
*Director of the United States Patent and Trademark Office*